No. 817,606. PATENTED APR. 10, 1906.
G. R. YANCEY.
ELECTRIC BRAKE.
APPLICATION FILED AUG. 7, 1905.
2 SHEETS—SHEET 1.
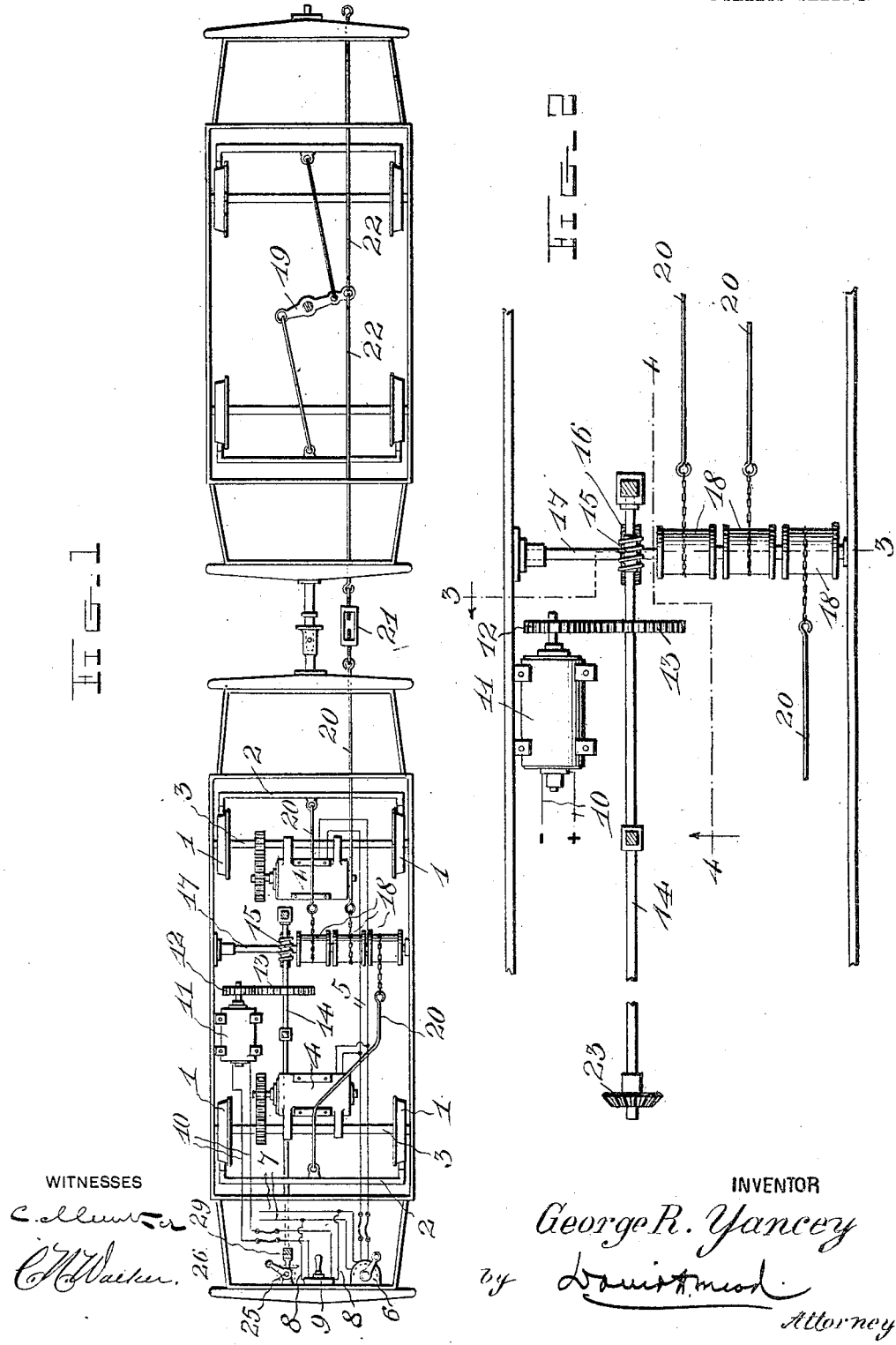
WITNESSES
INVENTOR
George R. Yancey
by
Attorney

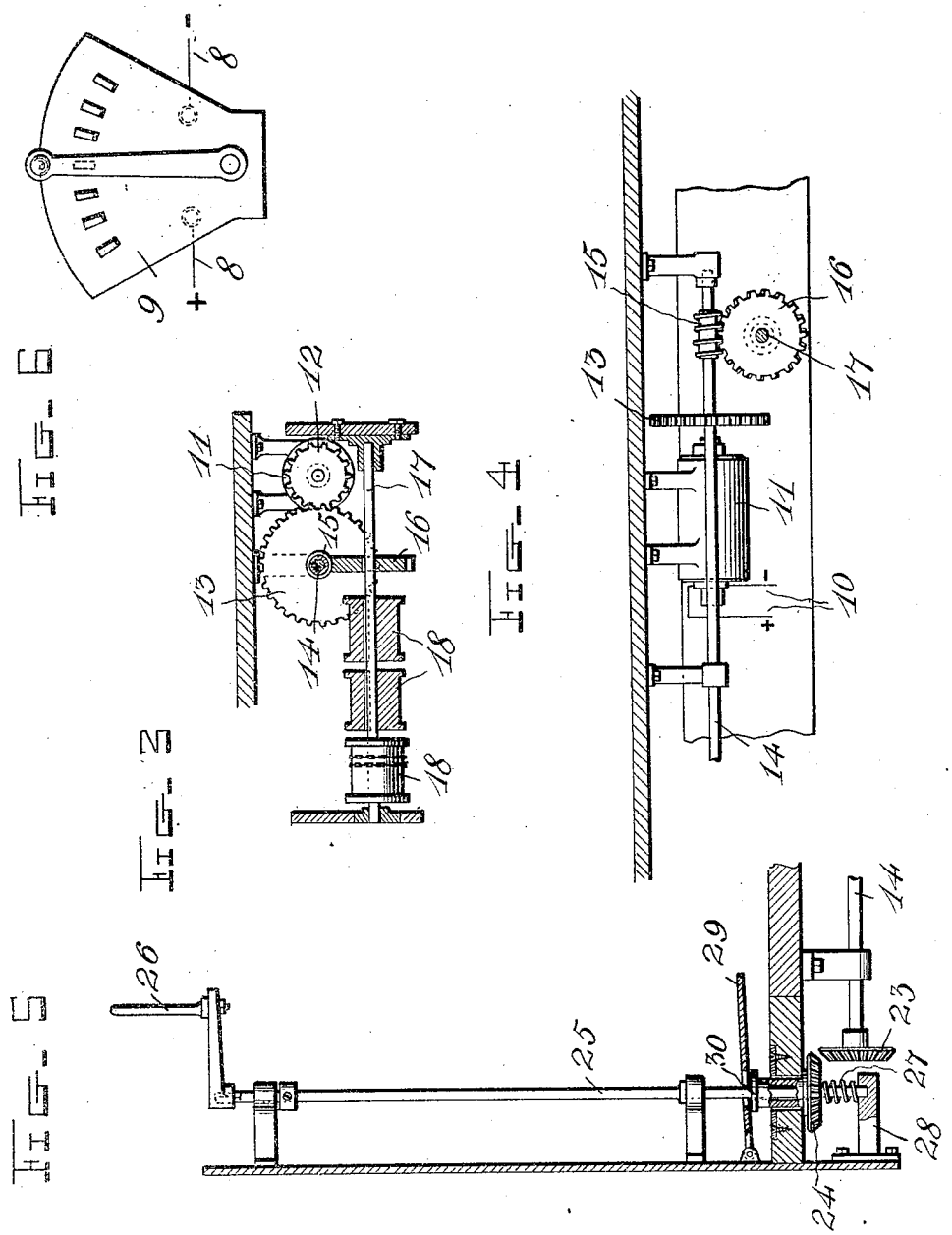

UNITED STATES PATENT OFFICE.

GEORGE R. YANCEY, OF LOUISVILLE, KENTUCKY, ASSIGNOR OF ONE-FOURTH TO WILLIAM A. KELLER AND ONE-FOURTH TO KARL KELLER, OF LOUISVILLE, KENTUCKY.

ELECTRIC BRAKE.

No. 817,606.  Specification of Letters Patent.  Patented April 10, 1906.

Application filed August 7, 1905. Serial No. 273,018.

*To all whom it may concern:*

Be it known that I, GEORGE R. YANCEY, a citizen of the United States, residing at Louisville, in the county of Jefferson and State of Kentucky, have invented certain new and useful Improvements in Electric Brakes, of which the following is a specification.

This invention relates to brake mechanism for single cars or trains, and it relates particularly to that class of these devices in which an electric motor is utilized for imparting movement to the operative parts of the device.

The primary object of the present invention is to provide a brake mechanism whereby the power necessary to check the movement of the wheels of a vehicle may be applied instantly and in a way which affords perfect control.

Further, the object of the invention is to provide a brake mechanism so constructed and arranged that the brake-shoes may be moved into and out of contact with the wheels of a vehicle either through the medium of an electric motor or manually at will, thus adapting the device for use under varying conditions.

The invention consists in the novel construction and arrangement of the parts, substantially as hereinafter described and claimed.

One form of embodiment of the invention is shown in the accompanying drawings, in which—

Figure 1 is a plan view of the trucks of two cars, showing my braking device applied thereto. Fig. 2 is an enlarged plan view showing particularly the means for connecting an electric motor with drums by which the brake-chains are operated. Fig. 3 is a detail view on the line indicated by line 3 3 of Fig. 2. Fig. 4 is a detail view on the line indicated by line 4 4 of Fig. 2. Fig. 5 is a view, partly in section, of the means for manually operating the brake; and Fig. 6 is a face view of the controller for operating the brake-motor.

In carrying out my invention, I mount on the truck of a single car or on the truck of one car of a train an electric motor which is supplied with current either from the same source as that from which the propelling-motor is supplied in an electric car or from some other source when the mechanism is applied to a car or train propelled by power other than electricity.

In the specific application shown in the accompanying drawings, and which will be now described, the device is shown applied to electric cars and the power for operating the brake is taken from the same source as that from which the propelling-motor is supplied.

In the drawings, 1 1 represent the supporting-wheels of a car to which are applied brake-shoes, through bars 2 2, of any of the well-known constructions.

Mounted adjacent to each axle 3 of the car is a driving-motor 4, receiving a current through conductors 5 5, extending from a controller 6. Current is supplied the motors through the controller 6 from conductors 7 7, receiving a current from any of the usual sources. Connected with the conductors 7 7 by branch wires 8 8 is a controller 9, and from this controller extend conductors 10, connecting the controller 9, and an auxiliary motor 11, suitably mounted on the truck of a car. The motor 11 is connected to the brake-beams of the car, so that when the armature thereof rotates in one direction the brake-shoes will be applied and when it rotates in the other direction they will be released, and the means by which this connection is effected will now be described.

Mounted on the armature-shaft of the motor 11 is a pinion 12, which meshes with a gear 13. The gear 13 is fixed on a shaft 14, one end of which is provided with a worm 15, which is arranged to engage the teeth of a gear 16, fixed on a drum-shaft 17. Any suitable number of drums 18 are mounted on the shaft 17 and around these drums are wound chains connected to the brake-beams. In the present illustration three drums are shown, two being for the control of the brake-bars on the car on which the motor is mounted and the other being for control of the bars of one or more adjoining cars. On the truck of each car adjoining that on which the motor 11 and the mechanism connected with it is mounted I arrange a lever 19, connected at each end to one of the brake-bars of the car. A connection 20, extending from one of the drums 18, is united with the lever 19 by means of a turnbuckle 21 and a rod 22. Two rods 22 are attached to each lever 19. They are of a length to extend to points between the truck of the car on which the lever is mounted and those of adjacent cars, where they are connected either with the extension from the drum or to a corresponding rod of an adjacent car by an easily detachable and adjustable device, such as a turnbuckle. By this arrangement of parts I am able to apply the brake-shoes of any number of cars by the employment of a single motor on one car of a train.

The use and operation of the brake mechanism described will be clear from the foregoing description. When the brakes are to be applied, the current is admitted to the motor 11 through a controller—such, for instance, as that shown in Fig. 6—in a direction to wind the chains on the drums. This motion is transmitted through the described connections to the brake-bars, and the shoes will instantly be applied to the wheels. When the car or cars are stopped, the current is cut off, leaving the shoes applied until it is desired to start the cars. No means for holding the parts in position to keep the brakes applied other than described is necessary, as the interposition of the worm in the connection between the motor and the drums is sufficient to check any movement of the drums, the movement of the gear fixed to the drum-shaft in a direction to unwind the chains being checked by engagement with worm. To release the brakes, the motor is caused to rotate in the opposite direction by the proper admission of current to the motor through the controller. In order that the brakes may be both applied and released by hand or may be released in this way when after they have been set through the operation of the motor the current has intentionally or otherwise been cut off from the car, I provide means independent of the electric motor for the purpose. To this end I extend the shaft 14 to a point adjacent to the position occupied by the person controlling the movement of the cars—for instance, to the platform occupied by the motorman on an electric car. On the shaft 14 is fixed a bevel-gear 23, and a corresponding gear 24, fixed on a shaft 25, is arranged to be brought to mesh with it. The shaft is suitably mounted in brackets and has a handle 26 for rotating it. The shaft is normally held in a position to separate the gears 23 and 24 by a spring 27, arranged to bear at one end on under face of the gear 24 and at the other end on a stud 28. A forked lever 29 is hinged adjacent to and bears on a collar 30, attached to the shaft 25. The free end of the lever is adapted to be depressed by the foot of an operator, and when this is done and the gears 23 and 24 brought into contact a connection between the shaft and the brakes is established and means for applying or releasing the brakes by hand, is afforded.

Having thus described my invention, what I claim as new, and desire to secure by Letters Patent, is—

1. A brake mechanism comprising brake-beams mounted on a car-truck and carrying shoes, an electric motor mounted on the same truck, drums connected with the motor, connections between the drums and the brake-beams, brake-beams mounted on an adjacent truck, a lever for operating the beams, a rod extending from the lever, and a detachable connection between the rod and one of the drums; substantially as described.

2. A brake mechanism comprising brake-beams mounted on a car-truck, an electric motor mounted on the same truck, drums arranged adjacent to the motor, a connection between the motor and the drums consisting of a shaft carrying a worm, gears connecting the shaft and the motor and a gear connecting the worm and the drums, connections between the brake-beams and the drums, brake-beams on an adjacent truck a lever for operating them, and a detachable connection between the lever and one of the drums; substantially as described.

3. A brake mechanism comprising brake-beams, an electric motor, a connection between the brake-beams and the motor including an elongated shaft, a shaft adapted to be rotated by hand, and a detachable connection between the two shafts, substantially as described.

4. A brake mechanism comprising brake-beams, an electric motor, drums connected with the brake-beams, a shaft interposed between the motor and the drums and connected to both by gearing, a shaft adapted to be rotated by hand and means for detachably connecting the two shafts; substantially as described.

In testimony whereof I affix my signature in presence of two witnesses.

GEORGE R. YANCEY.

Witnesses:
 CONRAD MUNKER,
 J. H. SIGGERS.